(No Model.)
M. DONOVAN.
SKID FOR VEHICLES.
No. 423,136. Patented Mar. 11, 1890.
Fig. 1.
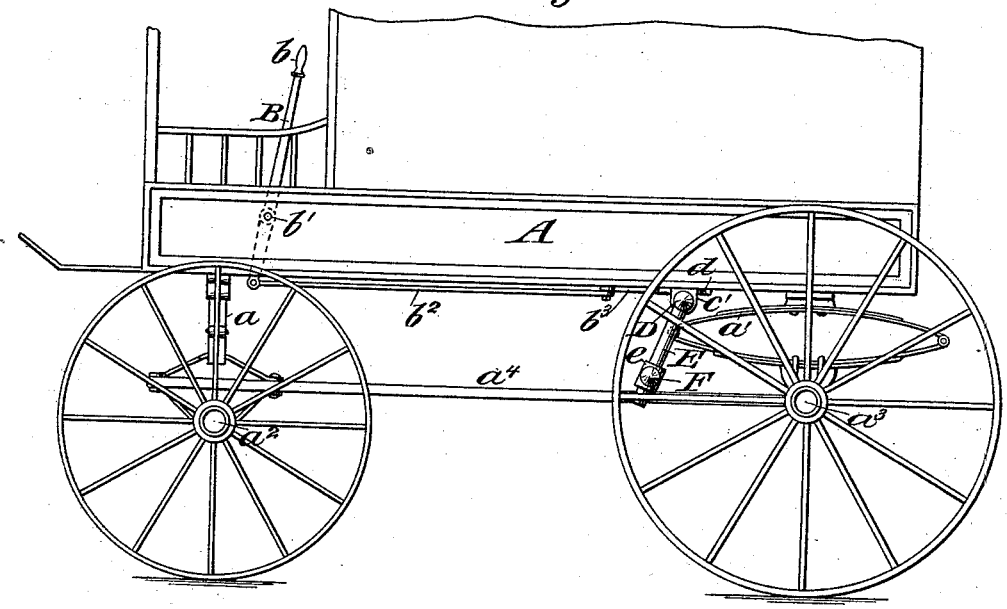
Fig. 2.
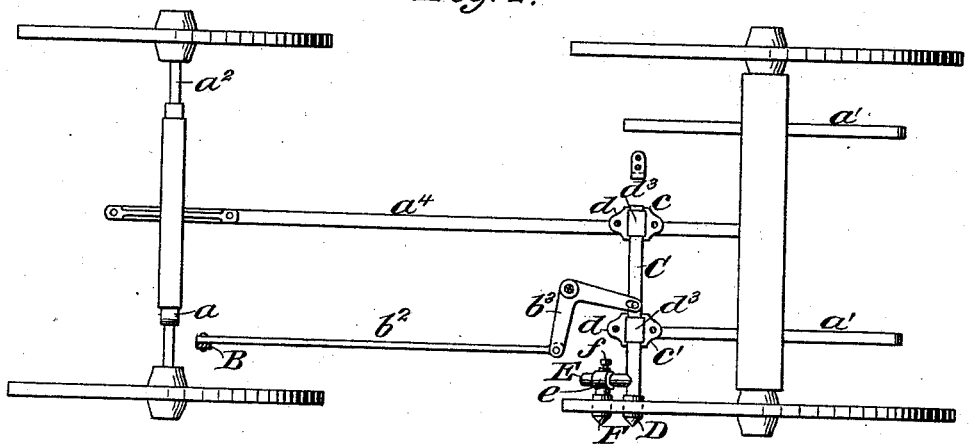
Fig. 4.   Fig. 3.
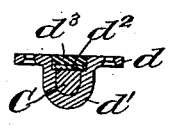 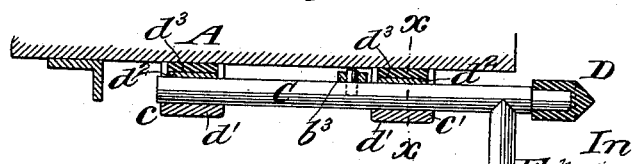
Witnesses:
C. Sundgren
W. H. Haywood
Inventor
Mathew Donovan
by his Attorneys
Brown & Griswold

UNITED STATES PATENT OFFICE.

MATTHEW DONOVAN, OF PATERSON, NEW JERSEY.

SKID FOR VEHICLES.

SPECIFICATION forming part of Letters Patent No. 423,136, dated March 11, 1890.

Application filed November 2, 1889. Serial No. 329,007. (No model.)

*To all whom it may concern:*

Be it known that I, MATTHEW DONOVAN, of Paterson, in the county of Passaic and State of New Jersey, have invented a certain new and useful Improvement in Skids for Vehicles, of which the following is a specification.

My improvement relates to skids employed to prevent the rotation of a wheel or wheels of a vehicle, the same to be applied when it is deemed necessary to use a brake or drag upon the vehicle—as, for instance, in descending a hill.

I will now describe a vehicle and skid embodying my invention in detail, and then point out the novel features in claims.

In the accompanying drawings, Figure 1 is a side elevation of a portion of a vehicle and a skid embodying my improvement. Fig. 2 is a plan or top view of the running-gear of a vehicle and showing a skid embodying my improvement applied thereto. Fig. 3 is a vertical section of a skid embodying my improvement. Fig. 4 is a detail in vertical section, taken on the line $x$ $x$, Fig. 3, and showing one of the bearing-pieces for a slider-bar comprised in the skid. Figs. 3 and 4 are drawn on a larger scale than Figs. 1 and 2.

Similar letters of reference designate corresponding parts in all the figures.

A designates a vehicle-body, which may be of ordinary or any suitable construction. As shown, said body is supported upon front springs $a$ and rear springs $a'$, which springs are in turn supported upon axles $a^2$ $a^3$. Between the axles $a^2$ $a^3$ extends a reach $a^4$.

The parts thus far described may be of any desired construction, as they do not broadly constitute part of my invention.

B designates a lever provided with a handle $b$, extending upwardly into position, where it may be grasped by the hand of a person occupying the vehicle. Said lever is fulcrumed at $b'$ upon the side of the vehicle-body. The lower arm of the lever is pivotally connected to one end of a link $b^2$, the other end of which link is connected to one of the arms of a bell-crank lever $b^3$, which bell-crank lever is fulcrumed upon the under side of the vehicle-body. The other arm of the bell-crank lever has a slotted connection with a slider-bar C, which slider-bar is adapted to be slid through bearings $c$ $c'$ when the handle $b$ is moved in either of two directions. The bearings $c$ $c'$ are secured to the bottom of the vehicle-body.

I have illustrated one of the bearings $c$ $c'$ more clearly in Fig. 4. Such bearing comprises a plate-like portion $d$, which portion is secured to the vehicle-body, and a downwardly-extending and hollow portion $d'$, through which the slider-bar C plays. Above the slider-bar C, in a suitable recess formed in the bearing, is a plate $d^2$, preferably of metal, and above the plate $d^2$ in the same recess is arranged a spring $d^3$, which spring is preferably made of india-rubber. The spring $d^3$ operates to force the slider-bar C into close contact with the hollow portion $d'$ of the bearing and produces sufficient frictional resistance to prevent accidental displacement of the slider-bar C from a position into which it has been adjusted. The outer end of the slider-bar is provided with a tip or point D, which is made of india-rubber. This tip is mainly cylindrical, and is provided with an internal socket by which it may be slipped over the end of the slider-bar, being retained thereon by friction. The outer extremity of this tip is conical in shape, as shown more clearly in Figs. 2 and 3.

I prefer that the slider-bar C should be provided with an arm E, which arm is rigidly secured to said slider-bar near the outer end of the latter and extends at approximately right angles thereto. Upon this arm there is mounted an adjustable tip or point F, which tip or point is like the tip or point D, except that its shank is provided with a sleeve $e$, which sleeve surrounds the arm E, and may be adjusted on said arm lengthwise thereof.

A set-screw $f$ is employed to secure the sleeve $e$, and consequently the tip F, in any position into which it may be adjusted upon the arm E. This adjustment provides for the application of the skid to different wheels or those having spokes at various distances apart. The conical form of the tips D F facilitates their ready insertion between the spokes of the wheel.

In the operation of my improved skid, if the lever B be rocked in one direction the tips or points D F will be moved between the spokes of one of the rear wheels of the vehicle, and will thus operate as a stop or block to prevent the rotation of said wheel, and consequently of the corresponding wheel upon the other end of the axle. This results in causing a drag by which a vehicle may be quickly stopped, and is particularly useful where a vehicle is going downhill or where horses may be running away.

What I claim as my invention, and desire to secure by Letters Patent, is—

1. The combination, with a vehicle, of a skid for blocking certain of the wheels thereof, said skid comprising a slider-bar provided with a tip and an arm extending from said slider-bar and provided with another tip, both said tips being adapted to be passed between the spokes of the wheel when the skid is moved in one direction, substantially as specified.

2. The combination, with a vehicle, of a skid for blocking certain of the wheels thereof, said skid comprising a slider-bar provided with an adjustable tip or point of india-rubber, substantially as specified.

3. The combination, with a vehicle, of a skid for blocking certain of the wheels of the vehicle, said skid comprising a slider-bar, bearings through which said slider-bar moves, and springs arranged in said bearings and operating upon the slider-bar, substantially as and for the purpose specified.

4. The combination, with a vehicle, of a skid for blocking certain of the wheels thereof, said skid comprising a slider-bar and an arm extending from said slider-bar, said arm being provided with an adjustable tip or point, substantially as and for the purpose specified.

MATTHEW DONOVAN.

Witnesses:
FREDK. HAYNES,
K. E. PEMBLETON.